(12) United States Patent
Batcher

(10) Patent No.: US 6,269,043 B1
(45) Date of Patent: Jul. 31, 2001

(54) POWER CONSERVATION SYSTEM EMPLOYING A SNOOZE MODE

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/629,715

(22) Filed: Jul. 31, 2000

(51) Int. Cl.[7] .................................................... G11C 7/00

(52) U.S. Cl. ......................................... 365/227; 365/233

(58) Field of Search ..................................... 365/227, 228, 365/233

(56) References Cited

U.S. PATENT DOCUMENTS 6,188,636 * 2/2001 Salomon .............................. 365/233

* cited by examiner

Primary Examiner—Terrell W Fears
(74) Attorney, Agent, or Firm—Arter & Hadden LLP

(57) ABSTRACT

A power conservation system which provides for fast and efficient transitions between fast and slow processor clocking speeds. The slow processor clocking speed minimizes power consumption during periods of processor inactivity (idle states) or low priority execution. The fast processor clocking speeds are utilized during periods of processor activity (active states) or high priority execution. Used in conjunction with a context-sensitive processor, the power conservation system is able to monitor the state of the processor and modify the processor clocking speed accordingly.

36 Claims, 2 Drawing Sheets

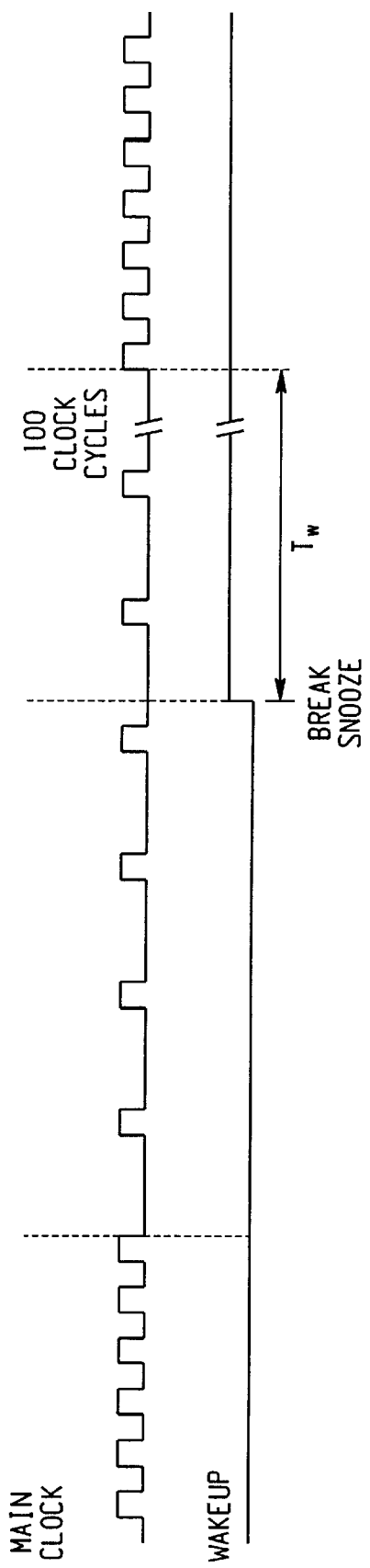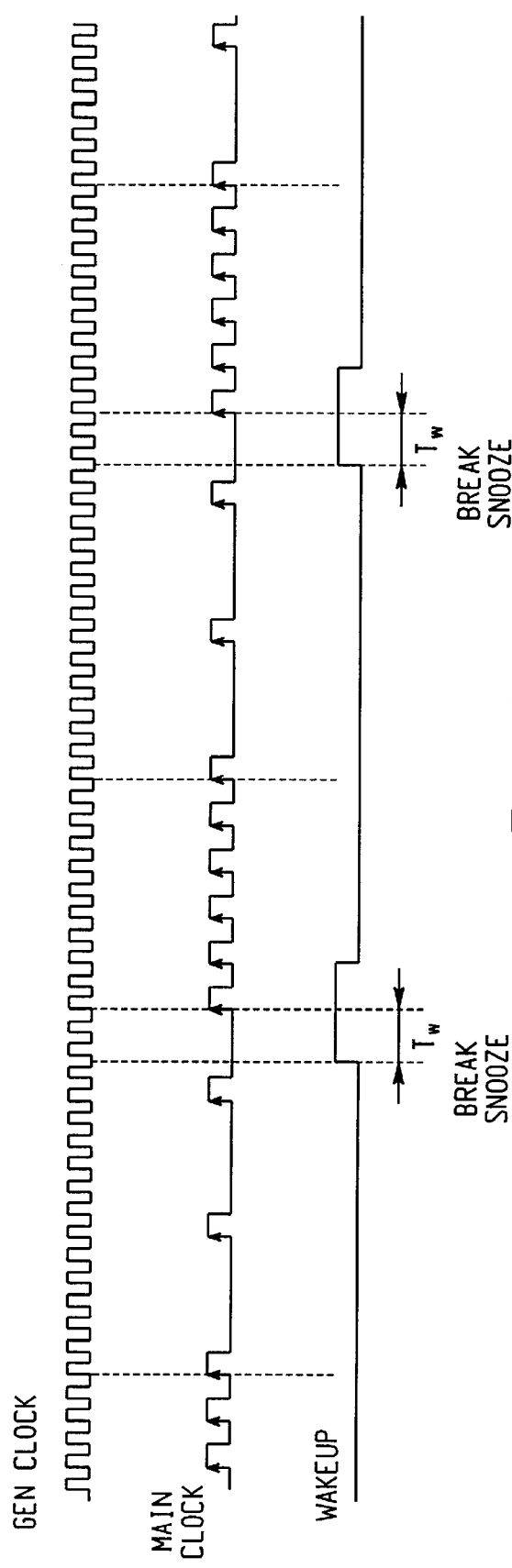

POWER CONSERVATION SYSTEM EMPLOYING A SNOOZE MODE

FIELD OF INVENTION

The present invention generally relates to a power conservation, and more specifically to a system for conserving processor power by utilization of a snooze mode.

BACKGROUND OF THE INVENTION

It is well recognized that power consumption is a primary concern in battery-powered electronics applications. For example, power consumption is a major concern with embedded processors that are employed in wireless electronics applications, such as laptop computers and handheld devices. These devices require longevity with conservation of battery life. It is further recognized that higher power consumption also results in the generation of higher heat, which can impair the performance of the electronics. Moreover, higher product costs may result from the need to use special packaging and housings in order to dissipating the heat.

With CMOS Application Specific Integrated Circuit (ASIC) devices, the largest factor of power consumption is "dynamic power." Dynamic power refers to the power consumed during the clocked operation of the device. In this regard, as flip-flops and CMOS logic change logic states (i.e., '0' to '1' or '1' to '0'), the associated transistors will consume power. Therefore, running the clock rate of the digital electronics as slowly as possible will reduce dynamic power consumption, since there will be fewer number of logic transitions per unit of time. However, reducing the clock rate of the digital electronics during periods of active device operation may not be an option in some situations. In this regard, high speed performance may demand high speed clocking in many cases. However, clocking a digital electronics device fast when it is in an "idle" state (i.e., not performing useful work) is wasteful of power, since a slower clock speed is suitable under such conditions.

The prior art discloses numerous power reduction techniques including those which use sleep modes with wait states, clock gating, or a selectable clock divider. An object of these prior art techniques is to reduce the switching clock frequency when the processor is in an idle state. However, these techniques require software to determine when to put the device in a sleep mode. Therefore, a watchdog background process typically runs to monitor processor utilization, and indicates when the processor is in an idle state. Upon detecting an idle state, the software must then enable a sleep mode to run the processor at a slow clock speed. In addition, an interrupt handler must be provided to disable the sleep mode and start the processor running again at full clock speed when the idle state has ended (i.e., when an active state has resumed). Consequently, the enable/disable function of the sleep mode requires significant overhead, and in addition typically requires on the order of hundreds of clock cycles to perform the modal switch associated with a change from idle state to active state. Thus, the "sleep modes" utilized in prior art techniques may be termed "heavyweight," since the act of enabling and disabling the sleep mode requires enormous overhead, including a significant number of clock cycles to perform the switch out of the sleep mode.

Another disadvantage of the "sleep modes" utilized in the prior art that use gated clocks, is the inherent design complexity. This leads to reduction in the overall top speed of the processor and presents clock skew issues among different clock domains.

The present invention addresses these and other disadvantages of the prior art to provide a dynamic and efficient system for clocking a digital electronics device at a fast clock speed only when the device requires the high speed performance (active state), and to clock the device at a slower clock speed at other times.

SUMMARY OF THE INVENTION

According to the present invention there is provided a power conservation system comprising: (a) clock generation means for generating a first clock signal having a first frequency; (b) wait state generation means for generating a wait state for modifying the first frequency; (c) enabling means for detecting at least one first operating condition of an associated electronic device, and generating an enable signal for enabling the wait state generation means to generate the wait state for modifying the first frequency; and (d) disabling means for detecting at least one second operating condition of the associated electronic device, and generating a disable signal for disabling the wait state generation means.

In accordance with another aspect of the present invention, there is provided a power conservation system comprising: (a) a clock generating circuit for generating a first clock signal having a first frequency; (b) a wait state circuit for generating a wait state for modifying the first frequency; (c) a first condition detecting circuit for detecting at least one first operating condition of an associated electronic device, and generating an enable signal for enabling the wait state generation circuit to generate the wait state for modify the first frequency; and (d) a second condition detecting circuit for detecting at least one second operating condition of the associated electronic device, and generating a disable signal for disabling the wait state generation means.

In accordance with still another aspect of the present invention, there is provided a method for conserving power consumed during clocked operation of an associated electronic device, the method including the steps of: (a) generating a first clock signal operating at a first frequency; (b) modifying the first clock signal to operate at a second frequency, in response to detection of at least one first operating condition of the associated electronic device; and (c) returning the first clock signal to the first frequency, in response to detection of at least one second operating condition of the associated electronic device.

An advantage of the present invention is the provision of a power conservation system for modifying a clock speed, which allows for quick and efficient changes in the operating clock speed between slow speed (snooze mode) and full speed (regular mode), depending upon the operating state of an associated processor.

Another advantage of the present invention is the provision of a power conservation system that does not require the overhead of prior art "sleep mode" systems, thus moving between regular mode to snooze mode quickly and efficiently.

Still another advantage of the present invention is the provision of a power conservation system that can utilize context state information provided by a processor with context switching hardware, in order to modify the processor clock speed accordingly.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is a timing diagram illustrating a prior art implementation of a snooze mode using a conventional software operating system;

FIG. 2 is a timing diagram illustrating an implementation of a snooze mode according to a preferred embodiment of the present invention.

DETAILED DESCRIPTION OF THE PREFERRED EMBODIMENT

Figure 3:
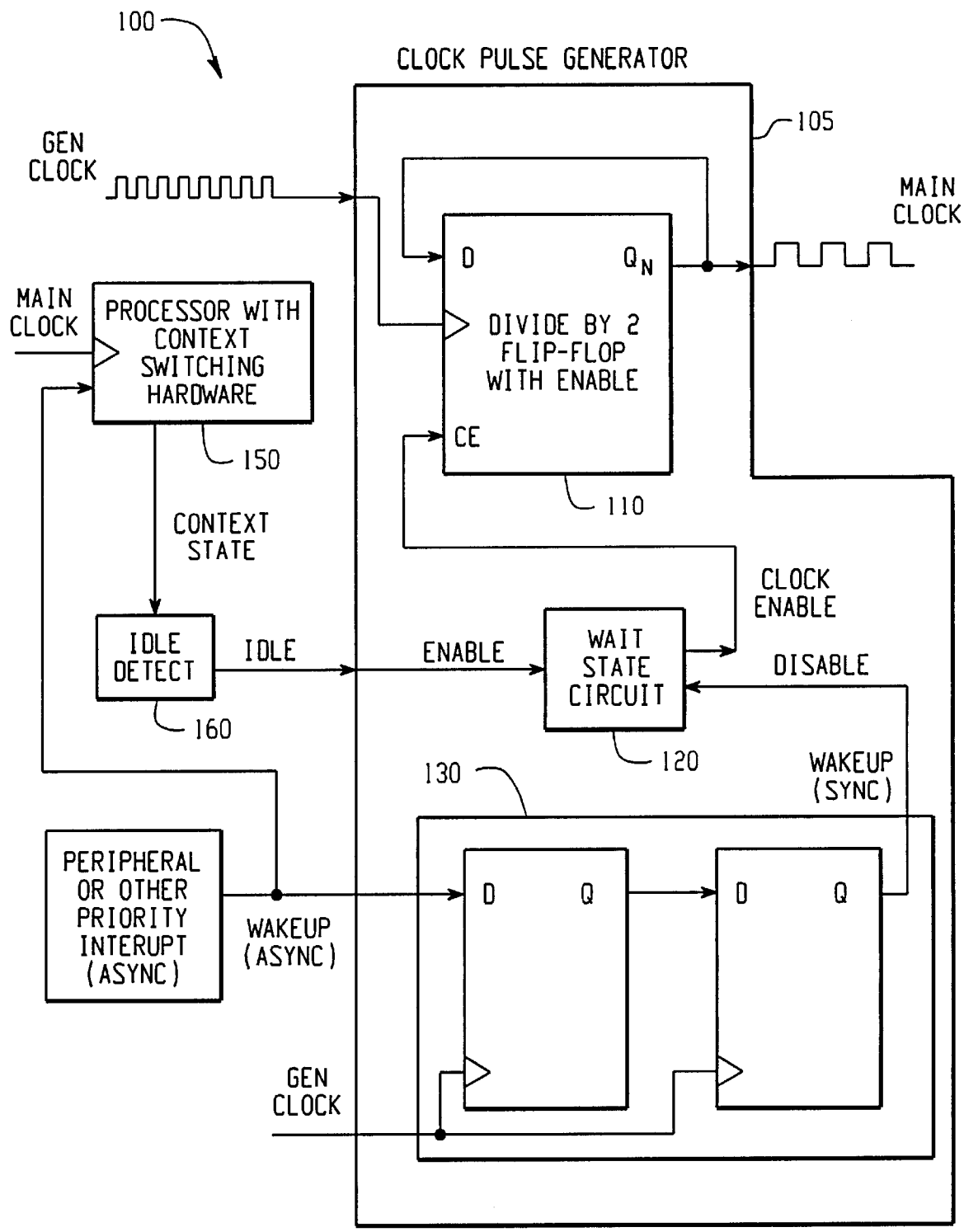
FIG. 3 is a block diagram of a circuit for implementing a preferred embodiment of the present invention.

It should be appreciated that a preferred embodiment of the present invention is described for use in conjunction with a processor that has built-in hardware-based context switching. The hardware-based context switching allows the operating state (e.g., idle or active) of the processor to be detected.

It should be understood that a particular process will run on a processor until it is context switched. This may happen when an event, such as the following, occurs: (a) a process exits, (b) a process uses up its time slice, (c) a process requires another resource that is not currently available or needs to wait for I/O to complete, (d) a resource has become available for a waiting process, (e) if there is a higher priority process ready to run, the processor will run the higher priority context instead, thus the current process is preempted, and (f) the process relinquishes the processor using a semaphore or similar system call.

Many different contexts may exist which have different priorities. The CPU engine itself processes events and interrupts, and determines in a single cycle which context should be running. Hence, this avoids the necessity of a software kernel to make this determination as done with conventional multi-tasking CPU engines. The processor itself therefore causes a context switch to occur, thus moving to an appropriate execution software thread to handle the event. Since registers for the various contexts may be banked, a context switch is done quickly and efficiently with no operating system (OS) overhead to process the interrupt. A special instruction is used to suspend an execution thread and return that context to waiting state until the next interrupt for that context occurs (similar to a blocking wait call with thread-based programming).

The CPU engine itself, being aware of pending events and running contexts, can also determine in a single clock cycle if all contexts are idle (e.g., no actions are required and all context execution threads are in the waiting state). Hence, the current state of the processor (i.e., idle state and active state) can be detected rapidly and efficiently by the hardware in a single clock cycle without any overhead.

Referring now to the drawings wherein the showings are for the purposes of illustrating a preferred embodiment of the invention only and not for purposes of limiting same, FIG. 3 illustrates a block diagram of a power conservation system 100 according to a preferred embodiment of the present invention. Power conservation system 100 is generally comprised of a clock pulse generator 105 and an idle detect circuit 160. Clock pulse generator 105 includes a divider 110 (which preferably takes the form of a "divide-by-two" D flip-flop), a wait state counter 120, and a wakeup circuit 130.

A processor 150 includes built-in context switching hardware which provides data indicative of the context state of the processor. Examples of such processors include the Motorola MCORE processor and the ARM7 processor. The built-in context switching hardware performs the function of traditional software-based context switching.

In accordance with a preferred embodiment, processor 150 normally runs off a very fast clock provided by the /2 ("divide-by-two") flip-flop output referred to as MAINCLK. The input clock for this flip-flop (referred to as GENCLK) is provided from an off-chip source and always runs at a high speed (e.g., 44 Mhz). Most of the dynamic power for the processor 150 therefore is consumed by the logic clocked by the MAINCLK which at full speed will run at GENCLK/222 (e.g., 22 Mhz). Hence, slowing it down will result in an overall reduction in power consumption for processor 150.

Idle detect circuit 160 receives the context state data from processor 150, and detects when no active context is running, which is indicative of an "idle" state. It should be appreciated that this detection is done by the hardware with no software interaction and is completely transparent to normal operation of the processor. In accordance with a preferred embodiment of the present invention, idle detect circuit 160 will receive an 8-bit binary vector indicative of context state. A high bit respectively indicates an active context, whereas a low bit respectively indicates an inactive context (one bit per context). Accordingly, when all of the bits are low, an idle condition is detected.

Idle detect circuit 160 acts as a switching circuit for switching the clock speed to a slow speed (snooze mode). Idle detect circuit includes a counter for determining how long the processor has been in an idle state. If the processor has been in an idle state for a programmable threshold value (e.g., 2 to 16 clock cycles), idle detect circuit 160 enables wait state circuit 120, which initiates a snooze mode. The programmable threshold is useful for preventing snooze mode assertion if the processor is going to wakeup very soon (e.g., is only idle for 1 clock cycle before an event occurs requiring it to go active again).

In a preferred embodiment, wait state circuit 120 includes a counter (e.g., a programmable 4-bit counter), and a plurality of configuration registers. The configuration registers store data bits indicating an enable/disable condition for the wait state circuit 120, and data bits indicative of the number of wait states for the snooze mode.

When enabled, wait state circuit 120 causes a predetermined delay in the generation of each clock pulse output by divider 110, by control of the CLOCK ENABLE (CE) signal input to divider 110. In this regard, the programmable counter of wait state circuit will cycle through count cycles (as established by a programmed count value), wherein each time the counter rolls over, the CLOCK ENABLE output signal is momentarily activated. When the CE input is low (disabled), no clock pulse will be output from clock pulse generator 105. When the CE input is high (enabled), clock pulse(s) are output from clock pulse generator 105. The predetermined delay in the generation of each clock pulse signal in the "snooze mode" is determined by the number of pulses that are counted by wait state circuit 120 before generating an enable signal.

In the snooze mode, many wait states are added to the clock to reduce the number of active clock edges in the processor. The wait state circuit adds "waits" to stretch the back half of the clock cycle just like a conventional wait state incurred for accessing a slow off-chip ROM device, for example. This delays the generation of the normally full speed processor clock (e.g., MAINCLK=GENCLK /2), forcing a reduction in overall clock frequency (e.g., MAINCLK GENCLK /16) while in "snooze mode." The snooze mode continues as long as the processor remains in the idle state.

Wakeup circuit 130 is used to detect when the processor has left or is about to leave (e.g., an interrupt is coming up) the idle state, and to disable wait state circuit 120. Wakeup circuit 130 includes means for generating a wakeup signal synchronized with GENCLK (i.e., WAKEUPsync). WAKEUPsync ends the snooze mode by disabling the counter of wait state circuit 120. This allows clock pulse generator 105 to safely restart generating clock pulses at the normal frequency (i.e., high speed). This change from slow speed clocking to high speed clocking is done very quickly in order to give the processor the best possible response time after leaving the idle state.

Wakeup circuit 130 receives an asynchronous signal from a peripheral or other priority interrupt (WAKEUPasync). A preferred embodiment of wakeup circuit 130 includes a pair of D flip-flops for synchronizing the WAKEUPasync signal with GENCLK. The output from wakeup circuit 130 is the synchronous wakeup signal (WAKEUPsync), which acts to disable wait state counter 120. In the disable condition, the CE input signal will be in an active state, such that MAINCLK will be half the frequency of GENCLK. It should be appreciated that the clock edge of the GENCLK is used to generate WAKEUPsync, since waiting until the "snoozed" MAINCLK edge occurs may significantly increase the time to change modes.

It should be appreciated that while D flip-flops are shown for divider 110 and wakeup circuit 130, other suitable circuit elements may be substituted therefor to provide the appropriate output signals.

Referring now to FIG. 1, there is shown a timing diagram illustrating the operation of prior art "sleep modes." Time Tw illustrates the time needed return the processor clock speed to high speed after an asynchronous WAKEUP signal is received. It should be noted that includes about 100 additional slow MAINCLK clock cycles which are not shown. FIG. 2 shows a timing diagram illustrating operation of the "snooze mode" of the present invention. GENCLK is the system master clock. The time Tw is much smaller in FIG. 2 due to the fact that the present invention uses the clock edge of the GENCLK to generate the WAKEUPsync that disables wait state circuit 120. Accordingly, within 2 cycles of GENCLK, the processor clock speed returns to high speed. By using the fast GENCLK edge for synchronization, the snooze mode is quickly exited. In contrast, it takes 2 cycles of the slow MAINCLK in order to synchronize the WAKEUP signal. in addition, it could take 100 or more slow MAINCLKs of software overhead to recognize the synchronized wakeup event and return the processor to high speed in the prior art approach (FIG. 1). It should be appreciated that the prior art approach requires: (1) time to synchronize the wakeup signal, and (2) time for the software to react and restore the MAINCLK to full speed (i.e., exit the snooze mode), whereas the present invention only needs time to synchronize the wakeup signal in order to exit the snooze mode. In this regard, use of hardware by the present invention eliminates the need for the overhead of the prior art.

As an example, when the processor is busy (i.e., active state), the clock speed may be, for example, 22 Mhz (GENCLK/2). When the processor is not busy (i.e., idle state), the clock speed may be reduced to 2 Mhz or 1 Mhz.

It should be appreciated that use of the "snooze mode" of the present invention, as opposed to a "sleep mode" of the prior art, represents a "lightweight" power reduction without the overhead of a "heavyweight" sleep. There is no overhead at all once the snooze mode is enabled. This is particularly advantageous if it is desired to snooze for a short amount of time (1 $\mu$s or so) before having to wakeup. For example, if it takes 10 $\mu$S to prepare a heavyweight sleep and 10 $\mu$s to wakeup, in accordance with the prior art, sleeping for 1 $\mu$s is not a suitable option, since it cannot compete with the overhead. Therefore, with the prior art "sleep mode" technique, there is no choice but to keep the processor clock running at full speed for that amount of idle time. Worse yet, if the processor alternates between 1 $\mu$s active (busy) and 1 $\mu$s idle (which is quite common in some applications), then it is not possible to use a heavyweight sleep of the prior art. Consequently, in accordance with prior art "sleep modes," the processor clock must run at full speed all the time.

The power conservation system of the present invention offers the perfect choice in many cases were power reduction is desired, but a heavyweight sleep is unsuitable, and where rapid context switching between "idle" to "active" to "idle" states occurs. This allows fast changes between fill and slow clocking speeds and yet still ensures proper high speed processing of time critical events. In accordance with the present invention, the response time for snooze mode wakeup is fast (e.g., 1 to 2 generating clocks), whereas the heavyweight sleep mode wakeup of the prior art may take several microseconds to synchronize the wakeup, react and restore full speed. Therefore, in situations where processor reaction time is a premium (e.g. response time to a high priority interrupt), the processor associated with prior art sleep mode systems will have to be run at full clock speed all of the time, in case such a high priority event occurs.

In accordance with an alternative embodiment of the present invention idle detect 160 is modified to also be responsive to a low priority execution condition. Thus, the processor clock speed is dynamically throttled as discussed above, but is changed to low speed during both idle state and during low priority execution. It should be appreciated that since the processor hardware is aware of context state, it is possible for the processor to determine if it is performing high priority execution, i.e., a high priority task (or about to do a high priority task) or a low priority task. Therefore, extra snooze wait states may be enabled when the processor is either in an idle state or performing a low priority task. Consequently, if the processor is in an idle state or not doing anything time critical (i.e., performing a low priority task), the processor can be run at a slower clock speed to reduce power consumption.

In the preferred embodiment of the present invention, there is are two clock operating speeds, namely full speed and slow speed. In yet another alternative embodiment of the present invention, a range of one or more snooze modes may be utilized. Each snooze mode has a different clock speed established by a different number of wait states provided by wait state counter 120. The context state of the processor is analyzed to determine the slowest suitable processor clock speed. By selected one of a plurality of clock speeds power consumption can be minimized. In this alternative embodiment, the processor clock speed is carefully tailored to correspond with the priority level of the task being executed by the processor. For example, the processor could have 8-level context switching, with 8 corresponding clocking speeds.

The present invention has been described with reference to a preferred embodiment. Obviously, modifications and alterations will occur to others upon a reading and understanding of this specification. For instance, it should be appreciated that while a preferred embodiment of the present invention has been described in connection with power conservation by modifying the clock speed associated with a processor, the present invention is also applicable to power conservation by modifying the clock speed associated with other electronic components, dependent upon the current operating conditions. It is intended that all such modifications and alterations be included insofar as they come within the scope of the appended claims or the equivalents thereof.

Having thus described the invention, it is now claimed:

1. A power conservation system comprising:
   means for generating a first clock signal having a first frequency;
   means for generating a wait state for modifying the first frequency;
   means for detecting at least one first operating condition of an associated electronic device,
   means for generating an enable signal for enabling the means for generating the wait state to generate the wait state for modifying the first frequency; and
   means for detecting at least one second operating condition of the associated electronic device, and
   means for generating a disable signal for disabling the means for generating the wait state, in response to detection of the at least one second operating condition.

2. A power conservation system according to claim 1, wherein said means for generating the disable signal generates the disable signal in synchronization with a second clock signal having a second frequency greater than said first frequency.

3. A power conservation system according to claim 1, wherein said at least one second operating condition is detected in response to receipt of an asynchronous interrupt signal.

4. A power conservation system according to claim 1, wherein said at least one first operating condition is detected in response to receipt of context state information associated with said associated electronic device.

5. A power conservation system according to claim 4, wherein said associated electronic device includes context switching hardware for generating the context state information.

6. A power conservation system according to claim 1, wherein said at least one first operating condition includes an idle state of said associated electronic device.

7. A power conservation system according to claim 1, wherein said at least one first operating condition includes a low-priority execution state of said associated electronic device.

8. A power conservation system according to claim 1, wherein said at least one second operating condition includes an active state of said associated electronic device.

9. A power conservation system according to claim 1, wherein said at least one second operating condition includes a high-priority execution state of said associated electronic device.

10. A power conservation system according to claim 1, wherein said associated electronic device is a processor.

11. A power conservation system according to claim 1, wherein said clock generation means includes at least one flip-flop.

12. A power conservation system according to claim 1, wherein said means for generating the wait state includes a counter.

13. A power conservation system according to claim 1, wherein said means for generating the disable signal includes at least one flip-flop.

14. A power conservation system comprising:
   a clock generating circuit for generating a first clock signal having a first frequency;
   a wait state circuit for generating a wait state for modifying the first frequency;
   a first condition detecting circuit for detecting at least one first operating condition of an associated electronic device, and generating an enable signal for enabling the wait state generation circuit to generate the wait state for modify the first frequency; and
   a second condition detecting circuit for detecting at least one second operating condition of the associated electronic device, and generating a disable signal for disabling the wait state generation means.

15. A power conservation system according to claim 1, wherein said second condition detecting circuit generates the disable signal in synchronization with a second clock signal having a second frequency greater than said first frequency.

16. A power conservation system according to claim 1, wherein said second condition detecting circuit detects the at least one second operating condition in response to receipt of an asynchronous interrupt signal.

17. A power conservation system according to claim 1, wherein said first condition detecting circuit detects the at least one first operating condition in response to receipt of context state information associated with said associated electronic device.

18. A power conservation system according to claim 4, wherein said associated electronic device includes context switching hardware for generating the context state information.

19. A power conservation system according to claim 1, wherein said at least one first operating condition includes an idle state of said associated electronic device.

20. A power conservation system according to claim 1, wherein said at least one first operating condition includes a low-priority execution state of said associated electronic device.

21. A power conservation system according to claim 1, wherein said at least one second operating condition includes an active state of said associated electronic device.

22. A power conservation system according to claim 1, wherein said at least one second operating condition includes a high-priority execution state of said associated electronic device.

23. A power conservation system according to claim 1, wherein said associated electronic device is a processor.

24. A power conservation system according to claim 1, wherein said clock generating circuit includes at least one flip-flop.

25. A power conservation system according to claim 1, wherein said wait state generating circuit includes a counter.

26. A power conservation system according to claim 1, wherein said a second condition detecting circuit includes at least one flip-flop.

27. A method for conserving power consumed during clocked operation of an associated electronic device, the method comprising:
   generating a first clock signal operating at a first frequency;
   modifying the first clock signal to operate at a second frequency, in response to detection of at least one first operating condition of the associated electronic device; and returning the first clock signal to the first frequency, in response to detection of at least one second operating condition of the associated electronic device.

28. A method according to claim 27, wherein said step of modifying the first clock signal to operate at a second frequency includes generation of wait states.

29. A method according to claim 27, wherein said step of returning the clock signal to the first frequency includes terminating the generation of wait states.

30. A method according to claim 27, wherein said first clock signal is returned to the first frequency in synchronization with a second clock signal operating at a third frequency greater than said first and second frequencies.

31. A method according to claim 27, wherein said at least one second operating condition is detected in response to receipt of an asynchronous interrupt signal.

32. A method according to claim 27, wherein said at least one first operating condition is detected in response to receipt of context state information generated by said associated electronic device.

33. A method according to claim 27, wherein said at least one first operating condition includes an idle state of said associated electronic device.

34. A method according to claim 27, wherein said at least one first operating condition includes a low-priority execution state of said associated electronic device.

35. A method according to claim 27, wherein said at least one second operating condition includes an active state of said associated electronic device.

36. A method according to claim 27, wherein said at least one second operating condition includes a high-priority execution state of said associated electronic device.

* * * * *